(12) United States Patent
Johnson et al.

(10) Patent No.: US 6,634,597 B2
(45) Date of Patent: Oct. 21, 2003

(54) METHOD AND APPARATUS FOR CONTROLLING AIRCRAFT AIRFLOW

(75) Inventors: Richard N. Johnson, Bellevue, WA (US); Paul E. Nelson, University Place, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/044,517

(22) Filed: Jan. 11, 2002

(65) Prior Publication Data

US 2003/0132344 A1 Jul. 17, 2003

(51) Int. Cl.[7] .............................................. B64D 13/02
(52) U.S. Cl. ...................................... 244/118.5; 454/76
(58) Field of Search .......................... 244/118.1, 118.5, 244/129.1; 454/69–74, 76, 77, 149

(56) References Cited

U.S. PATENT DOCUMENTS

| | | | | |
|---|---|---|---|---|
| 2,122,447 A | * | 7/1938 | Zand | 244/118.5 |
| 3,101,918 A | * | 8/1963 | Evelyn et al. | 244/76 R |
| 3,129,910 A | * | 4/1964 | Smith | 244/139 |
| 4,314,341 A | | 2/1982 | Kivela | |
| 4,394,861 A | * | 7/1983 | Sciortino | 244/118.5 |
| 4,418,879 A | * | 12/1983 | Vanderleest | 244/53 B |
| 4,979,699 A | * | 12/1990 | Tindell | 244/53 B |
| 5,609,021 A | * | 3/1997 | Ma | 60/274 |

OTHER PUBLICATIONS

FlightSafetyBoeing, 777 Systems (3 pages), May 2000.
Hughes, David, "Fokker 70 Meets Short–Haul Needs," Aviation Week & Space Technology (pp. 42–44), Mar. 21, 1994.
Fokker 70, Cutaway Drawing Key, Air International, pp. 270–271, Nov. 1995.
Electronic Code of Federal Regulations, 14 CFR, Chapter I, Part 25 (2 pages), Jun. 5, 1996.

* cited by examiner

*Primary Examiner*—Galen L. Barefoot
(74) *Attorney, Agent, or Firm*—Perkins Coie LLP (57) ABSTRACT

A method and apparatus for controlling aircraft airflow. An apparatus in accordance with an embodiment of the invention can include an air scoop having an inlet and an outlet and configured to mount to the aircraft and be movable relative to at least a portion of the aircraft between a first position and a second position. The air scoop can be oriented to capture air when in the second position. The outlet can be configured to be coupled in fluid communication with a pressurized portion of the aircraft when the air scoop is in the second position to convey air from the inlet to the pressurized portion. The air scoop can be configured to significantly increase the drag of the aircraft from a first value when the air scoop is in the first position to a second value when the air scoop is in the second position.

86 Claims, 7 Drawing Sheets

METHOD AND APPARATUS FOR CONTROLLING AIRCRAFT AIRFLOW

CROSS-REFERENCE TO RELATED APPLICATIONS

The material disclosed in the present application is related to material disclosed in pending U.S. patent application Ser. No. 09/815,390 filed Mar. 22, 2001 and incorporated herein in its entirety by reference.

TECHNICAL FIELD

The present invention relates to aircraft airflow control devices, for example, devices for retarding airspeed and/or bringing aboard external airflow.

BACKGROUND

Figure 1A:
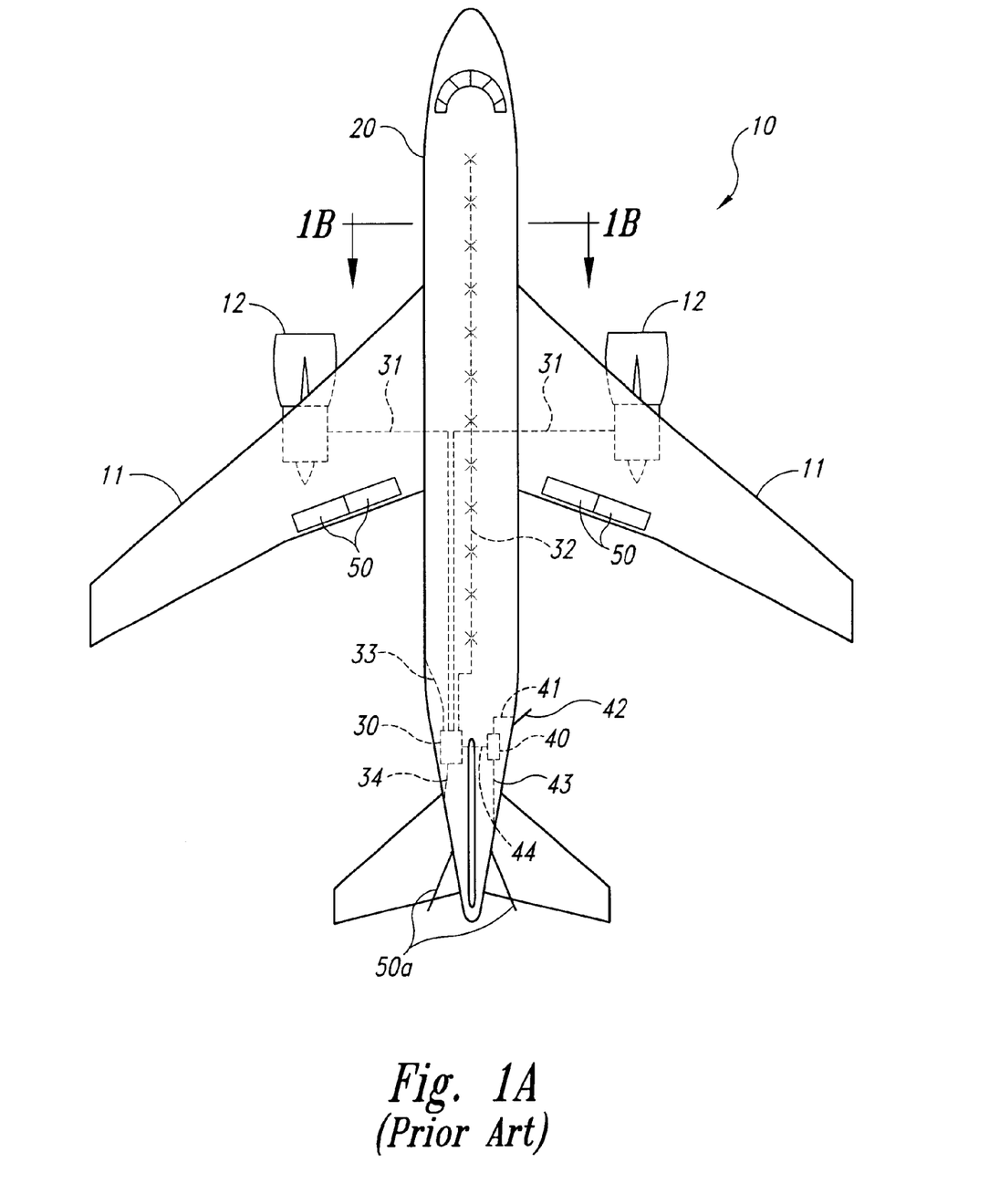
FIG. 1A is a plan view of a commercial transport aircraft in accordance with the prior art.

FIG. 1A is a partially schematic plan view of a typical commercial transport aircraft 10 in accordance with the prior art. The aircraft 10 includes a fuselage 20 and swept wings 11 carrying primary engines 12. Each wing 11 can include at least one wing speed brake 50 to reduce aircraft airspeed, for example, during normal descent and landing approach, or during an emergency descent. Alternatively, the aircraft 10 can include a fuselage-mounted speed brake 50a to perform the same functions.

The aircraft 10 can also include an environmental control system (ECS) pack 30 that supplies conditioned, pressurized air to the aircraft cabin. In a typical installation, the ECS pack 30 can receive pressurized air bled from the compressors of the primary engines 12 and delivered to the ECS pack 30 via compressor bleed air ducts 31. The ECS pack 30 can condition the air (for example by filtering and/or cooling the air) before delivering the air to the cabin via an ECS supply duct 32. The ECS pack 30 can be cooled with external cooling air supplied by a cooling air inlet duct 33. The cooling air can exit the aircraft 10 via a cooling air exhaust duct 34.

The aircraft 10 can further include an auxiliary power unit (APU) 40. One function performed by the APU 40 is to supply pressurized air to the ECS pack 30 when the primary engines 12 are not doing so. Accordingly, the APU 40 can include a gas turbine that receives air through an APU inlet duct 41. The APU inlet duct 41 receives air from a deployable APU inlet scoop 42, which is normally flush with the aircraft fuselage 20 when the APU 40 is not running, and is deployed outwardly to capture air for the APU inlet duct 41 when the APU 40 is operating. The APU combustion products exit the aircraft 10 via an APU exhaust duct 43, and pressurized air is bled from the APU 40 and supplied to the ECS pack 30 via an APU bleed duct 44. Accordingly, the APU 40 can supply pressurized air for distribution to the cabin in lieu of or in addition to pressurized air supplied by the primary engines 12.

Figure 1B:
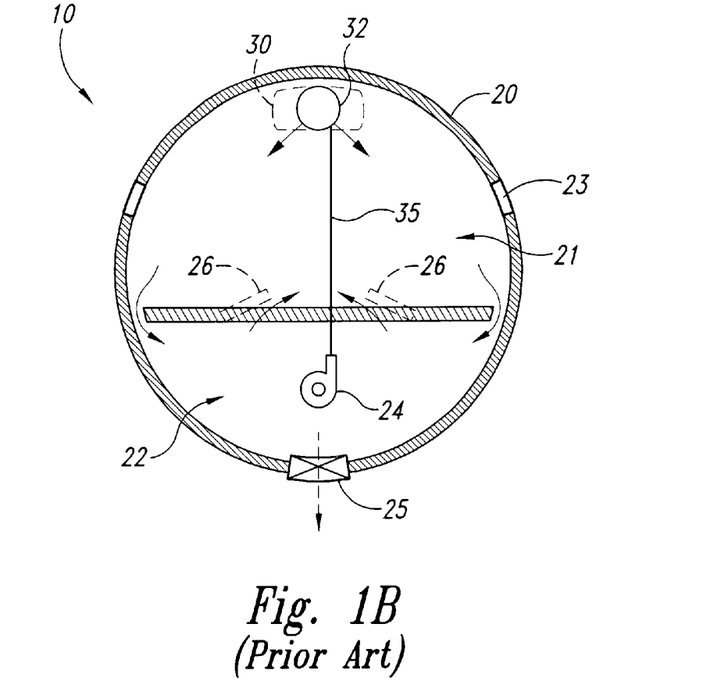
FIG. 1B is a partially schematic cross-sectional view of a commercial transport aircraft fuselage taken substantially along, line 1B—1B of FIG. 1A.

FIG. 1B is a partially schematic, cross-sectional view of the fuselage 20 of the aircraft 10 taken substantially along line 1B—1B of FIG. 1A. As shown in FIG. 1B, the fuselage 20 houses a cabin area 21 positioned above a cargo area 22. The ECS supply duct 32 supplies pressurized air to the cabin area 21 to maintain a pressurized environment within the cabin area 21. Typically, the cabin area 21 is kept at a pressure-altitude of about 8,000 feet (i.e., a pressure corresponding to the standard pressure at an altitude of 8,000 feet). The air supplied to the cabin area 21 also passes downwardly to the cargo area 22. A portion of the pressurized air is then dumped overboard via an exhaust valve 25. Air remaining in the cargo area 21 can then be returned to the ECS pack 30 via a pump 24 and an ECS return duct 35. The ECS pack 30 can supplement the recycled air with make-up air from the compressor bleed ducts 31 (FIG. 1A) and return the pressurized air to the cabin area 21. The cargo area 22 can further include floor release valves 26 (such as upwardly opening floor panels) that can relieve pressure in the cargo area 22 in the event that the cargo area 22 becomes overpressurized.

One goal of the commercial aircraft transport industry is to convey passengers and cargo as quickly as possible from one point to another. As the speeds of commercial aircraft have increased, the cruising altitudes of these aircraft have also increased to maintain overall flight efficiency. One drawback with increasing aircraft altitude is that it can increase the likelihood of exposing passengers to very low air pressures in the event the cabin area 21 becomes depressurized. For example, if a window 23 of the fuselage 20 fails, the pressure within the fuselage 20 can rapidly decrease. Accordingly, Federal Aviation Regulations (FARs) require that for selected depressurization events, the aircraft passengers and crew be exposed to pressure-altitudes of greater than 25,000 feet for a period not to exceed two minutes.

As the cruising altitude for aircraft increases, meeting the foregoing requirement presents at least two difficulties. For example, as the aircraft operate in increasingly thinner atmospheric conditions, the aircraft systems must become larger and/or significantly more efficient to maintain cabin pressure during a depressurization event. Furthermore, the time required to descend from a high cruise altitude to an altitude below 25,000 feet increases significantly. Existing speed brake systems are typically inadequate to allow an aircraft to rapidly descend from an altitude of 40,000 feet or higher, and ECS packs must be substantially increased in size and weight to adequately pressurize the cabin area during a descent following a depressurization event.

SUMMARY

The present invention is directed toward methods and apparatuses for controlling aircraft airflow. An apparatus in accordance with one aspect of the invention includes an air scoop having an inlet and an outlet and being configured to mount to the aircraft to be movable relative to at least a portion of the aircraft between a first position and a second position. The air scoop can be oriented to capture air when in the second position, and the outlet can be configured to be coupled in fluid communication with a pressurized portion of the aircraft when the air scoop is in the second position to convey air from the inlet to the pressurized portion. The air scoop can be configured to significantly increase the drag of the aircraft from a first value when the air scoop is in the first position to a second value when the air scoop is in the second position. Accordingly, in one aspect of the invention, the air scoop can increase the descent rate of the aircraft and provide pressurization for the interior of the aircraft.

In a further aspect of the invention, the apparatus can include a valve in fluid communication with the air scoop. The valve can be changeable from a first configuration to a second configuration with the valve being positioned to pass none of the captured air or a first quantity of the captured air toward the pressurized portion of the aircraft when in the first configuration, and with the valve positioned to pass a second quantity of the captured air toward the pressurized portion when in the second configuration, with the second quantity being greater than the first quantity. The apparatus can further include a latch member operatively coupled to the valve and movable between a first latch position and a second latch position, with the latch member at least restricting a change in configuration of the valve when the latch member is in the first latch position, and allowing a change in the configuration of the valve when the latch member is in the second latch position. A pressure sensor can be operatively coupled to the latch member to move the latch member from the first position to the second position when a pressure within the pressurized portion falls below a selected value. Accordingly, the latch can allow pressurization of the aircraft following a depressurization event, and can lock out operation of the valve, for example, during a normal descent.

The invention is also directed toward a method for controlling aircraft airflow. In one aspect of the invention, the method can include significantly increasing a drag of the aircraft by moving an air scoop from a first position to a second position. The method can further include conveying at least a portion of the air intercepted by the air scoop to a pressurized portion of the aircraft. In a further aspect of the invention, air captured by the air scoop can be directed into a cargo portion of the fuselage and then from the cargo portion to a cabin portion of the fuselage. In still another aspect of the invention, the air captured by the air scoop can be directed into the pressurized portion of the aircraft, bypassing the primary engines, auxiliary power units, and/or environmental control systems before entering the pressurized portion. Accordingly, the air scoop can operate to pressurize the aircraft independently of the bypassed systems.

DETAILED DESCRIPTION

The present disclosure describes methods and apparatuses for controlling aircraft airflow. In one embodiment, an apparatus in accordance with an embodiment of the invention can serve as a speed brake (during normal and/or emergency descents) and can provide pressurized air to the aircraft, for example, after a depressurization event. Many specific details of certain embodiments of the invention are set forth in the following description and in FIGS. 2–10 to provide a thorough understanding of these embodiments. One skilled in the relevant art, however, will understand that the present invention may have additional embodiments, and that the invention may be practiced without several of the details described below.

Figure 2:
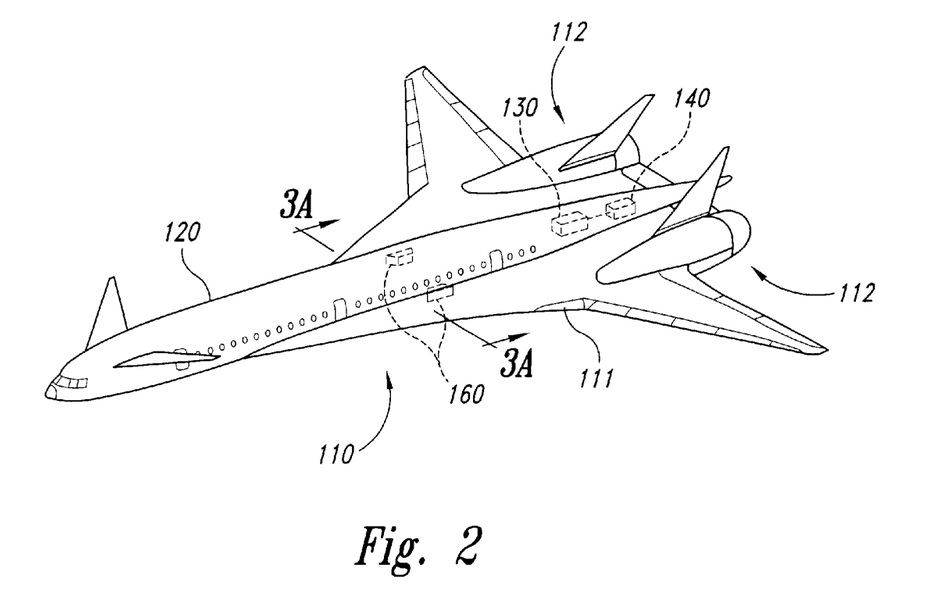
FIG. 2 is a partially schematic isometric view of an aircraft in accordance with an embodiment of the invention.

FIG. 2 is a partially schematic isometric view of an aircraft 110 that includes a pair of airflow control devices 160 in accordance with an embodiment of the invention. In one aspect of this embodiment, the aircraft 110 can have an integrated fuselage/propulsion system/wing/aft body arrangement generally similar to those described in co-pending U.S. application Ser. No. 09/815,390. Accordingly, the aircraft 110 can include a fuselage 120 and a delta wing 111 having dual integrated primary propulsion systems 112. In other embodiments, the aircraft 110 can have other configurations, for example, a fuselage/wing configuration generally similar to that described with reference to FIGS. 1A–B. In any of these embodiments, the aircraft 110 can include an ECS pack 130 configured to supply pressurized air to the aircraft, and an APU 140 configured to supply pressurized air and/or power to the aircraft in lieu of or in addition to the pressurized air and power supplied by the primary propulsion systems 112.

Figure 3A:
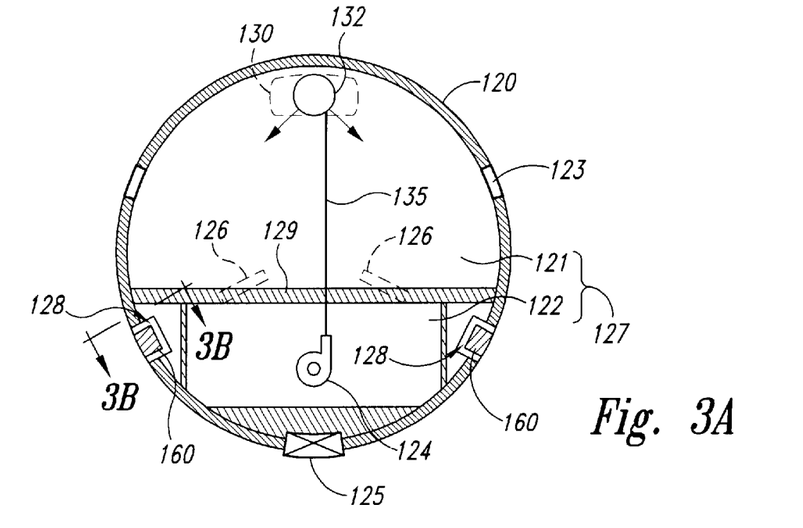
FIG. 3A is a cross-sectional view of a fuselage of the aircraft shown in FIG. 2 taken substantially along line 3A—3A.

FIG. 3A is a partially schematic cross-sectional view of the fuselage 120 shown in FIG. 2 in accordance with an embodiment of the invention. The fuselage 120 can include a pressurized portion 127 and unpressurized portions 128. The pressurized portion 127 can include a cabin portion 121 separated from a cargo portion 122 by a floor 129. The ECS pack 130 can supply pressurized air to the cabin portion 121 via an ECS supply duct 132, and the pressurized air can pass from the cabin portion 121 to the cargo portion 122 through vents (not visible in FIG. 3A) in the floor 129. Some of the pressurized air can be dumped from the aircraft 110 via an exhaust valve 125, and the remaining air can be recycled with a pump 124 and an ECS return duct 135, as was generally described above. Floor release panels 126 can open upwardly to relieve excess pressure in the cargo portion 122, as was also generally described above. In one embodiment of the invention, the cargo portion 122 can receive pressurized air from the airflow control devices 160 housed in the adjacent unpressurized portions 128, as described in greater detail below with reference to FIGS. 3B–8.

Figure 3B:
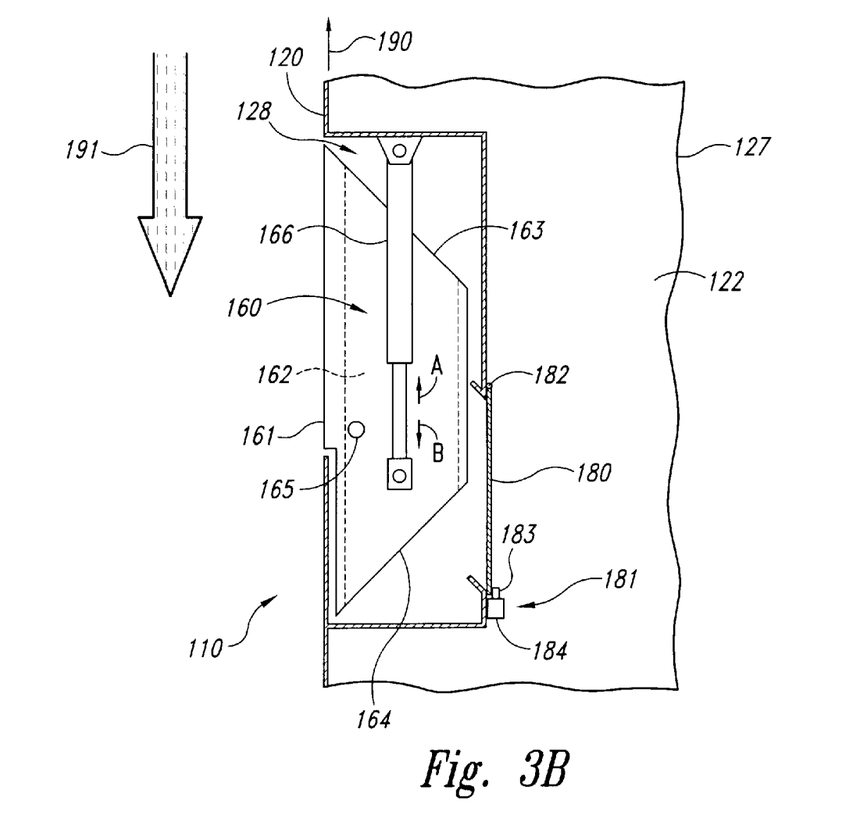
FIG. 3B is a partially schematic view of an aircraft airflow control device taken substantially along line 3B—3B of FIG. 3A.

FIG. 3B is a partially schematic view of a portion of the fuselage 120 taken substantially along line 3B–3B of FIG. 3A. The direction of travel of the aircraft 110 is indicated by arrow 190, and the relative flow direction of air external to the aircraft 110 is indicated by arrow 191. As shown in FIG. 3B, the airflow control device 160 can include an air scoop 161 housed in the unpressurized portion 128 and movable relative to the fuselage 120 between an undeployed or stowed position (shown in FIG. 3B) and a deployed position (described below with reference to FIGS. 4 and 5). The air scoop 161 can be pivotably coupled to the fuselage 120 with a pivot 165, and can be rotated about the pivot 165 with an actuator 166, such as a linear hydraulic actuator. The actuator 166 can be extended (as shown by arrow B) to position the air scoop 161 in the undeployed position, and can be retracted (as shown by arrow A) to move the air scoop 161 into the deployed position. In other embodiments, the air scoop 161 can be moved between the undeployed and deployed positions in other manners and/or with other devices.

In one aspect of the embodiment shown in FIG. 3B, the air scoop 161 can have an inlet 163, an outlet 164, and an airflow duct 162 extending between the inlet 163 and the outlet 164. In another aspect of this embodiment, the inlet 163 can have a generally square or rectangular capture area in a plane generally normal to the plane of FIG. 3B. Accordingly, the airflow duct 162 and the outlet 164 can have corresponding square or rectangular cross-sectional shapes. In other embodiments, the inlet 163, the airflow duct 162 and the outlet 164 can have other cross-sectional shapes. In any of these embodiments, the capture area (and therefore frontal area) of the inlet 163 can be substantial relative to the size of the aircraft 110. For example, an aircraft configured to carry about 220 passengers at near-sonic cruise velocities (e.g., Mach 0.95–0.99 and/or Mach 1.1–1.2) can have two air scoops 161, each with a frontal area of about 12 ft$^2$. In other embodiments, the capture area of the air scoops 161 can have other values depending, for example, on the configuration of the aircraft in which the air scoops 161 are installed.

The airflow control device 160 can further include a valve 180 positioned between the pressurized portion 127 and the unpressurized portion 128 of the fuselage 120. In one embodiment, the valve 180 can be positioned adjacent to the cargo portion 122, and in other embodiments the valve 180 can be positioned adjacent to other areas of the pressurized portion 127, such as the cabin portion 121 (FIG. 3A). The valve 180 can be selectively moved between a closed position (shown in FIG. 3B) to at least approximately seal the cargo portion 122 from the unpressurized portion 128, and an open position (described in greater detail below with reference to FIG. 5) to allow fluid communication between the cargo portion 122 and the air scoop 161 in the unpressurized portion 128.

In one embodiment, the valve 180 can swing freely about a pivot 182 between the open and closed positions as a result of a pressure differential across the valve 180. Alternatively, the valve 180 can be moved with a valve actuator (not shown in FIG. 3B). In either embodiment, the valve 180 can function as a check valve to prevent air from escaping from the fuselage 120 at any time. Accordingly, in an embodiment in which the valve 180 includes an actuator, the actuator can be configured not to restrict the valve 180 from closing when the pressure in the fuselage 120 exceeds the pressure in the airflow control device 160.

The valve 180 can pivot between the open and closed positions or, alternatively, the valve 180 can move in other manners. In any of these embodiments, a latch member 181 can be positioned to control the motion of the valve 180. In one embodiment, the latch member 181 can include a moveable pin 183 coupled to an actuator 184. In its extended position (shown in FIG. 3B), the pin 183 can prevent the valve 180 from moving from its closed position to its open position. When retracted, the pin 183 can allow the valve 180 to open. The actuator 184 can include or be coupled to an internal aircraft pressure sensor to move the pin 183 only when the aircraft undergoes a depressurization event (as described in greater detail below with reference to FIG. 5) to prevent the valve 180 from opening when the airflow control device 160 is deployed during normal descent.

Figure 4:
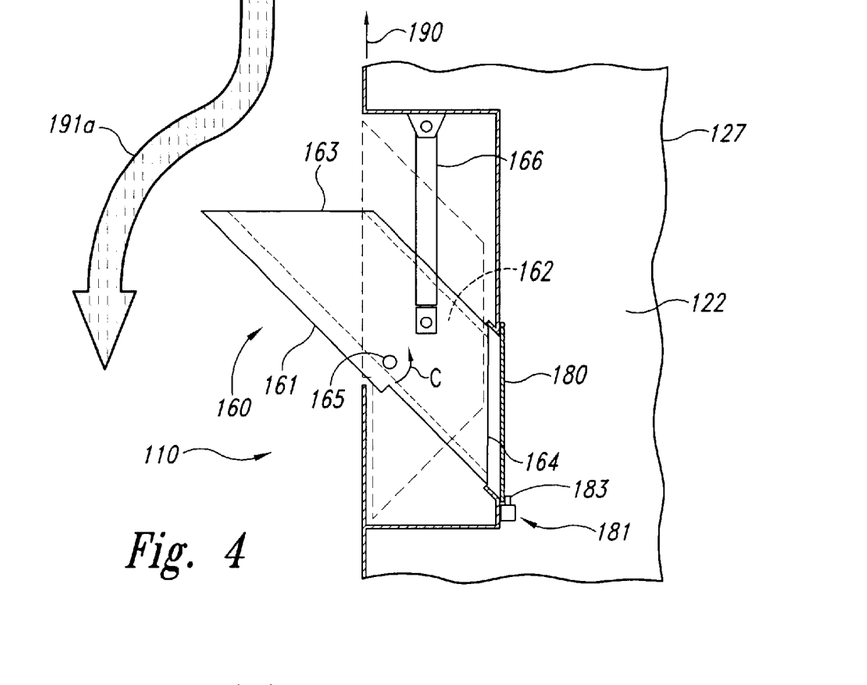
FIG. 4 illustrates the airflow control device of FIG. 3B in a deployed state in accordance with an embodiment of the invention.

FIG. 4 schematically illustrates an embodiment of the airflow control device 160 in its deployed position. In one aspect of this embodiment, the actuator 166 has been retracted to rotate the air scoop 161 about the pivot 165 (as indicated by arrow C) from a flush position (or an at least partially retracted position) to a position in which the inlet 163 extends into the flow of air external to the aircraft 110. The valve 180 can initially remain closed when the air scoop 161 moves to its deployed position. Accordingly, the air external to the aircraft 110 is prevented from passing through the airflow duct 162 and into the cargo portion 122. Instead, the blocked airflow duct 162 can form an aerodynamic drag device that diverts the oncoming air (as indicated by arrow 191a) in a manner that can substantially increase the drag of the aircraft 110.

The effect of the deployed air scoops 161 has been estimated for an aircraft 110 of the type shown in FIG. 2. In one embodiment, the aircraft can have an initial "clean" value of drag divided by aircraft frontal area at a cruise Mach number of from about 0.95 to about 0.99. When two air scoops 161 of the type shown in FIG. 4 are deployed, the value of aircraft drag divided by frontal area has been estimated to increase as described below.

In one embodiment, deploying two air scoops 161 of the type shown in FIG. 4 can increase the drag divided by the frontal area of the aircraft shown in FIG. 2 by from about 30% to about 100% at a cruise Mach number of between about 0.95 and 0.99, relative to the drag divided by frontal area for the same aircraft without the air scoops 161 deployed. At lower aircraft speeds, the increase in drag divided by frontal area can be from about 25% to about 100%. In other embodiments, the air scoops 161 can increase the drag of the aircraft by other amounts. In any of these embodiments, the increase in drag created by the air scoops 161 can be significant enough to substantially increase the aircraft descent rate. Accordingly, the air scoops 161 can be deployed during normal operation (such as during descent and landing approach) to aid in reducing aircraft airspeed and altitude.

In a further aspect of these embodiments, the air scoops 161 can be positioned in any of a plurality of partially deployed positions (located between the undeployed position shown in FIG. 3B and the fully deployed position shown in FIG. 4) to control the amount of drag added to the aircraft during normal descent. The air scoops 161 can be moved from their undeployed positions to their deployed positions in one relatively swift, continuous motion or, alternatively, the air scoops 161 can be deployed in a series of incremental motions (for example, during supersonic flight) to mitigate the impact of the air scoops 161 on other aircraft systems, such as flight control surfaces. The air scoops 161 can also be partially or fully deployed in an emergency to rapidly descend from a relatively high altitude (such as an altitude above 40,000 feet) to a lower altitude, as described in greater detail below.

Figure 5:
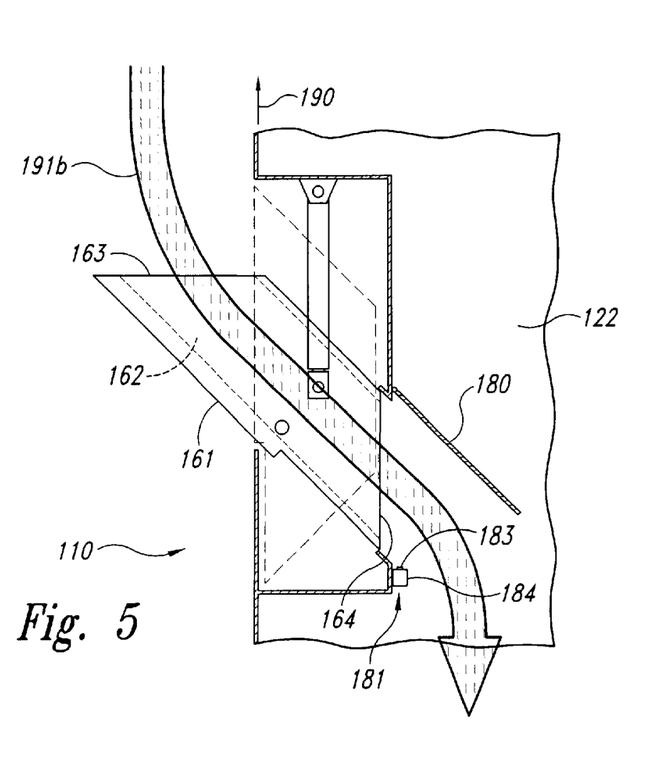
FIG. 5 illustrates the airflow control device of FIG. 3B positioned to direct external air into the aircraft fuselage in accordance with an embodiment of the invention.

In an embodiment in which the air scoops 161 are deployed to rapidly decrease aircraft altitude during or after a depressurization event, the air scoops 161 can also provide air to the pressurized portion 127 of the aircraft 11 0. In one aspect of this embodiment, the pin 183 of the latch member 181 can retract when a depressurization event is detected, as shown in FIG. 5. During the initial descent, the total pressure of the air in the air scoop 161 (and at the outlet 164) will be less than the pressure within the cargo portion 122. Accordingly, the internal pressure remaining within the cargo portion 122 can prevent the valve 180 from opening. As the aircraft continues to descend and depressurize, the total pressure of the air in the air scoop 161 increases and the pressure within the cargo portion 122 decreases. When the total pressure in the air scoop 161 exceeds the pressure in the cargo portion 122, the valve 180 moves inwardly to its open position so that air external to the aircraft 110 can travel through the air scoop 161 and into the cargo portion 122, as shown by arrow 191b.

Returning now to FIG. 3A, the pressurized air within the cargo portion 122 can open the floor release panels 126 to provide a flow of pressurized air into the cabin portion 121. Accordingly, during a depressurization event (such as a failure of one or more of the windows 123), the airflow control devices 160 can both increase the rate at which the aircraft 110 descends and provide pressurized air to the cabin portion 121.

Figures 6, 7:
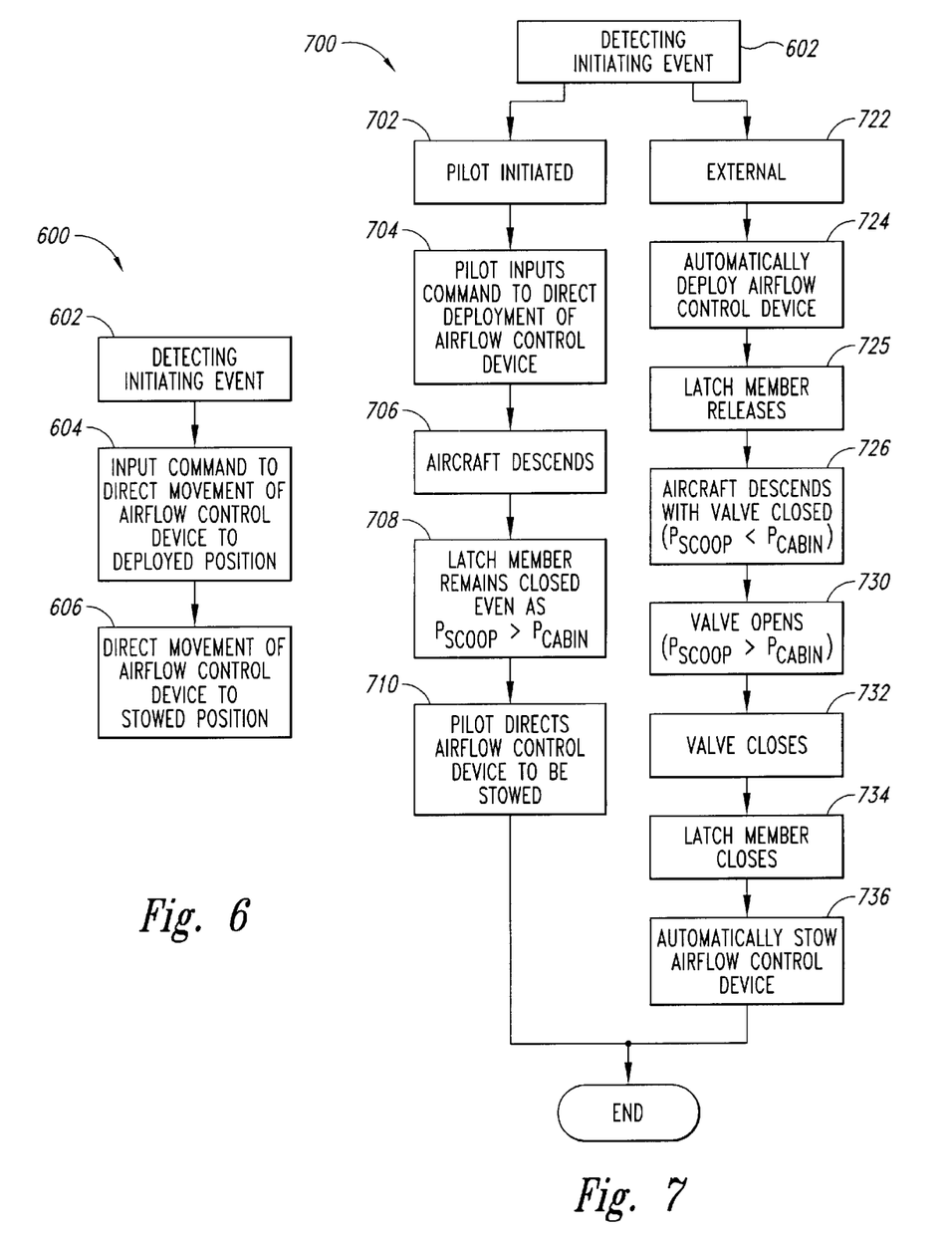
FIG. 6 is a flow diagram illustrating stages of a method for operating an airflow control device in accordance with an embodiment of the invention.
FIG. 7 is a flow diagram illustrating stages of a method for operating an airflow control device in accordance with another embodiment of the invention.

FIGS. 6 and 7 are flowcharts illustrating methods for operating the airflow control device 160 in accordance with embodiments of the invention. In other embodiments, the airflow control device 160 may be operated in accordance with different procedures and/or different orders of procedures. Beginning with FIG. 6, a method 600 can include detecting an initiating event 602. The initiating event can be a normal or emergency situation for which the airflow control device is to be deployed, as described in greater detail below with reference to FIG. 7. In procedure 604, a command is input to direct the movement of the airflow control device from the stowed position to the deployed position. In procedure 606, the method can include directing the movement of the airflow control device back to the stowed position.

Referring now to FIG. 7, the initiating event can include a pilot initiated event 702 (such as a command to descend for approach and landing) or an external initiating event 722 (such as a depressurization event at cruise altitude). When the initiating event is a pilot initiated event, the pilot can input a command to direct the deployment of the airflow control device in procedure 704. The aircraft descends in procedure 706, and in procedure 708, the latch member 181 (FIG. 4) remains in its engaged position to prevent the valve 180 (FIG. 4) from opening, even as the pressure in the air scoop 161 (FIG. 4) exceeds the pressure within the pressurized portion of the aircraft 110. Accordingly, the airflow control device 160 will not tend to pressurize the cabin when it is deployed during a normal descent. Once the aircraft has descended to the desired altitude, or landed, the pilot can direct the airflow control device to move to the stowed or undeployed position (procedure 710).

When the initiating event is an external event 722 (such as an emergency depressurization of the aircraft), the airflow control device 160 can be automatically moved to its deployed position (procedure 724). Alternatively, procedure 724 can be commanded by the pilot. In procedure 725, the latch member 181 can automatically release when the depressurization event is detected, for example, when the pressure within the aircraft falls below a preselected value. In procedure 726, the aircraft descends with the valve 180 closed, so long as the total pressure within the air scoop 161 is less than the pressure within the pressurized portion of the aircraft 110. When the total pressure within the air scoop 161 exceeds the aircraft internal pressure, the valve 180 can open (procedure 730) to pressurize the aircraft. In procedure 732, the valve 180 can close, for example, when the pressure within the aircraft exceeds a selected value. Alternatively, the valve 180 can be closed with a valve actuator. In procedure 734, the latch member 181 can return to its extended or engaged position, and in procedure 736, the airflow control device 160 can be automatically stowed. Alternatively, the airflow control device 160 can be stowed prior to closing the valve 180. In one embodiment, procedures 722–736 can be performed automatically (for example, by a computer) without any input from the pilot or other operator, and with or without pilot override. Alternatively, any or all of procedures 722–736 can include pilot or other operator input, even during emergency operation.

Figure 8:
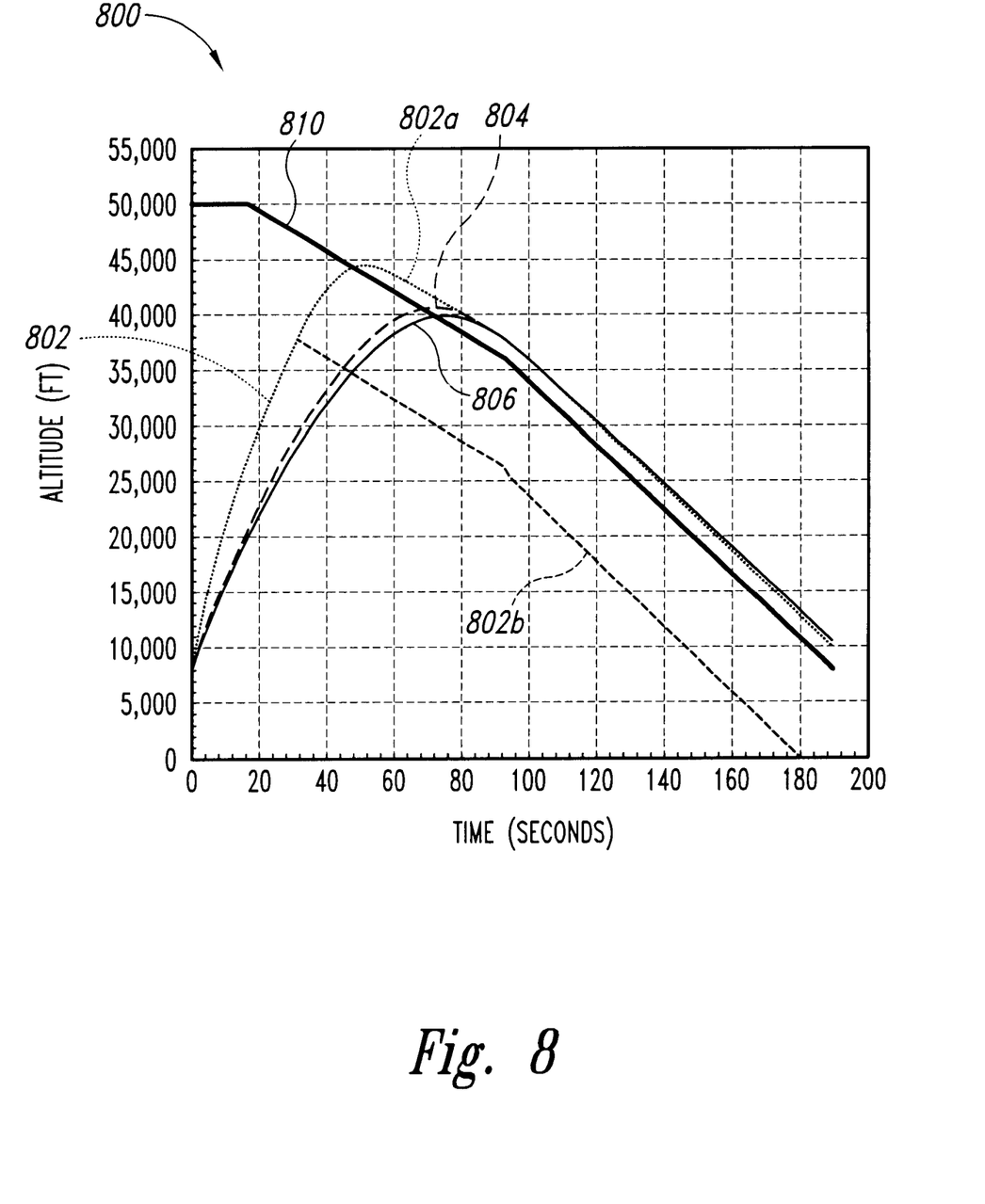
FIG. 8 is a graph illustrating predicted cabin pressures for an aircraft having an airflow control device arrangement in accordance with an embodiment of the invention.

FIG. 8 illustrates predicted aircraft altitude and cabin pressure-altitude values for an aircraft having a payload capacity of about 220 passengers and a subsonic cruise Mach number of 0.95 or above, with and without an airflow control device arrangement in accordance with an embodiment of the invention. In one aspect of this embodiment, the aircraft can have a "clean" value of drag force per frontal area of about 52 lb/ft$^2$ at cruise, with no airflow control devices deployed.

As shown in FIG. 8, a graph 800 illustrates aircraft altitude and cabin pressure-altitude (on the vertical axis) as a function of time (on the horizontal axis) during aircraft descent. Line 810 illustrates the aircraft altitude, and line 802 illustrates the aircraft cabin pressure-altitude after a depressurization event in which a 309 in$^2$ hole is opened in the fuselage. For purposes of comparison, lines 804 and 806 illustrate pressure-altitudes for descent with a 200 in$^2$ hole and a 187 in$^2$ hole, respectively.

Referring now to line 802, the pressure within the fuselage immediately begins to decrease upon initiation of a depressurization event at time t=0. Shortly afterward, the aircraft begins its descent. The pressure-altitude within the cabin exceeds 25,000 feet at about t=12 seconds. Without an airflow control device, the cabin pressure-altitude curve follows line 802a and remains above 25,000 feet until about t=140 seconds. Accordingly, without an airflow control device, the cabin is exposed to a pressure-altitude greater than 25,000 feet for about 128 seconds.

Line 802b illustrates the pressure-altitude in the cabin for the same initial conditions discussed above with reference to lines 802 and 802a, assuming that an airflow control device arrangement in accordance with an embodiment of the invention is deployed. As shown by line 802b, the airflow control device can begin adding air to the pressurized portion of the fuselage at approximately t=32 seconds. The pressure-altitude within the fuselage can fall below 25,000 feet at t=96 seconds. Accordingly, the fuselage can be exposed to a pressure altitude greater than 25,000 feet for only 84 seconds, a substantial reduction when compared with predicted results for an aircraft without the airflow control device. In addition, the maximum pressure altitude within the cabin during the depressurization event can be reduced, for example, from 44,000 feet (line 802a) to 37,000 feet (line 802b).

Figure 9:
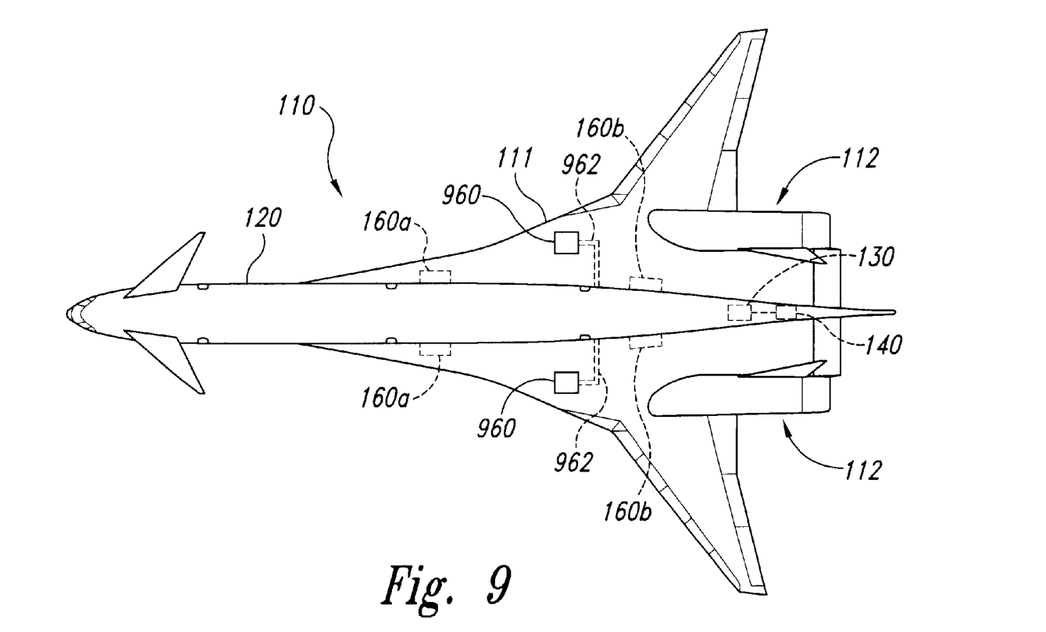
FIG. 9 is a plan view of an aircraft having a plurality of pairs of airflow control devices in accordance with another embodiment of the invention.

FIG. 9 is a partially schematic plan view of an aircraft 110 having a plurality of airflow control devices in accordance with another embodiment of the invention. In one aspect of this embodiment, the aircraft 110 can include a forward pair of airflow control devices 160a and an aft pair of airflow control devices 160b, all of which are mounted to and deployed from the fuselage 120. In one aspect of this embodiment, all four airflow control devices 160a–b can be deployed simultaneously. Alternatively, one pair of airflow control devices can be deployed separately from the other, for example, to provide a reduced level of drag increase. In yet a further aspect of this embodiment, the airflow control devices 160a–b can be positioned relatively close to the center of lift of the aircraft 110 to limit the amount of aircraft pitch-up or pitch-down that results when only one pair of airflow control devices is deployed. In yet a further aspect of this embodiment, airflow control devices 160a–b on one side of the fuselage 120 can be deployed without deploying the airflow control devices on the other side of the fuselage 120 to induce a yawing moment.

In still another embodiment, the airflow control devices can be mounted to the aircraft wing 111. For example, the aircraft 110 can include two airflow control devices 960, each mounted on the wing 111 on opposite sides of the fuselage 120. Each airflow control device 960 can be coupled to the fuselage 120 with an airflow duct 962 to pressurize the fuselage 120 in a manner generally similar to that described above with reference to FIGS. 3A–7. In one aspect of this embodiment, the airflow control devices 960 can be mounted on the wing upper surface. In other embodiments, the airflow control devices 160 and/or 960 can be coupled to other portions of the aircraft.

Figure 10:
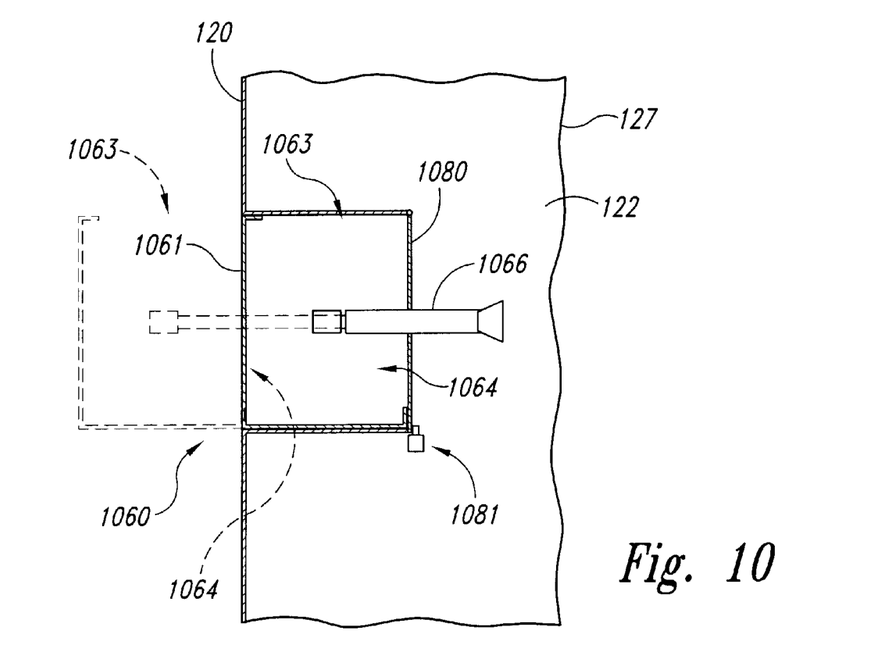
FIG. 10 is a partially schematic illustration of a translating airflow control device in accordance with yet another embodiment of the invention.

FIG. 10 is a partially schematic cross-sectional view of an airflow control device 1060 that translates between a stowed position (shown in solid lines in FIG. 10) and a deployed position (shown in dashed lines in FIG. 10). In a further aspect of this embodiment, the airflow control device 1060 can include an air scoop 1061 having an inlet 1063 and an outlet 1064 positioned to direct air into the pressurized portion 127 (such as the cargo portion 122) of the aircraft fuselage 120. The flow of air into the cargo portion 122 can be controlled with a valve 1080 and a latch member 1081 that operate in a manner generally similar to the valve 180 and latch member 181 described above with reference to FIGS. 3B–7. An actuator 1066 can move the air scoop 1061 between the stowed position and the deployed position. In other embodiments, the airflow control device 1060 can move between the stowed and deployed positions in other manners.

One feature of the embodiments of the airflow control devices described above with reference to FIGS. 2–10 is that they can include air scoops that move between a stowed position (in which the air scoop has a zero or negligible effect on aircraft drag) and a deployed position (in which the air scoop has a substantial or significant effect on aircraft drag). Accordingly, the air scoops can increase the aircraft rate of descent during normal approach and landing and/or during an emergency descent. This advantage can be particularly beneficial for aircraft with high wing planform areas (such as delta-winged aircraft) but can also be beneficial for aircraft having conventional swept-wing configurations.

Another feature of the embodiments of the airflow control devices described above with reference to FIGS. 2–10 is that they can deliver pressurized air to the pressurized portion of the fuselage in addition to or in lieu of increasing aircraft drag, to reduce the time during which the fuselage is exposed to low pressures during a depressurization event. An advantage of this arrangement is that the air scoops can provide an additional source of pressurized air during an aircraft depressurization event, and can reduce the time during which passengers and/or cargo in the aircraft are exposed to low atmospheric pressures. Still another advantage of this feature is that in at least one embodiment, the same device (i.e., the airflow control device) can provide both the increased descent rate capability and the cabin pressurization capability in a single aircraft system.

Yet another feature of at least one embodiment of the airflow control device described above with reference to FIGS. 2–10 is that the air scoops can provide pressurized air to the cargo portion and make use of existing floor release panels to pass the pressurized air into the cabin portion. One advantage of this feature is that the air provided by the air scoop can bypass any aircraft turbomachinery (such as the primary engines and auxiliary power unit) such that the delivery of pressurized air is independent of these turbomachinery devices. Another advantage of this feature is that the air can pass through the cargo portion 122 before entering the cabin portion 121 and accordingly has an opportunity to heat up and diffuse before entering the cabin portion 121. Still another advantage of this feature is that the benefits of passing the air through the cargo portion 122 first can be achieved without requiring additional ducting beyond that provided in the aircraft for normal ECS system operation.

Yet another feature of the embodiments described above is that the air initially entering the cabin portion from the air scoop can bypass the ECS pack 130. Accordingly, air can be introduced into the aircraft after a depressurization event without requiring the ECS pack 130. An advantage of this arrangement is that the aircraft can be pressurized even if the depressurization event adversely affects the ECS pack 130.

From the foregoing, it will be appreciated that specific embodiments of the invention have been described herein for purposes of illustration, but that various modifications may be made without deviating form the spirit and scope of the invention. Accordingly, the invention is not limited except as by the appended claims.

We claim:

1. An apparatus for controlling aircraft airflow, comprising:
    an air scoop having an inlet and an outlet, the air scoop being configured to mount to the aircraft and be movable relative to at least a portion of the aircraft between a first position and a second position, with the air scoop oriented to capture air when in the second position; wherein
    the outlet is configured to be coupled in fluid communication with a pressurized portion of the aircraft when the air scoop is in the second position to convey air from the inlet to the pressurized portion; and wherein
    the air scoop is configured to significantly increase the drag of the aircraft from a first value when the air scoop is in the first position to a second value when the air scoop is in the second position, the increase in drag being sufficient to increase a rate of descent of the aircraft from a third value when the air scoop is in the first position to a fourth value when the air scoop is in the second position.

2. The apparatus of claim 1 wherein the air scoop is configured to convey the captured air with at least a portion of the captured air bypassing all primary engines and auxiliary power units of the aircraft before entering the pressurized portion of the aircraft.

3. The apparatus of claim 1, further comprising:
    an airflow valve coupled in fluid communication with the air scoop, the airflow valve being moveable from a first valve position to a second valve position, the airflow valve being positioned to pass none of the captured air or a first quantity of the captured air toward the pressurized portion when in the first valve position, the airflow valve being positioned to pass a second quantity of the captured air toward the pressurized portion when in the second valve position, the second quantity of the captured air being greater than the first quantity;
    a latch member operatively coupled to the airflow valve and moveable between a first latch position and a second latch position, with the latch member at least restricting motion of the airflow valve when the latch member is in the first latch position, and with the latch member allowing motion of the airflow valve when the latch member is in the second latch position; and a pressure sensor operatively coupled to the latch member to move the latch member from the first latch position to the second latch position when a pressure within the pressurized portion falls below a selected value.

4. The apparatus of claim 1 wherein the air scoop is configured to increase the drag of the aircraft divided by a frontal area of the aircraft from a first value to a second value that is from about 1.25 to about 2.0 times the first value.

5. The apparatus of claim 1 wherein the inlet has a capture area, and wherein the inlet is oriented with no portion or a first portion of the capture area exposed when the air scoop is in the first position, the inlet being oriented with a second portion of the capture area exposed when the air scoop is in the second position, the second portion of the capture area being greater than zero and/or greater than the first portion.

6. The apparatus of claim 1 wherein the air scoop is configured to be pivotably mounted to a fuselage of the aircraft and is pivotable between the first position and the second position.

7. The apparatus of claim 1 wherein the air scoop is a first air scoop positionable on one side of a fuselage of the aircraft, and wherein the apparatus further comprises a second air scoop positionable on an opposite side of the fuselage.

8. The apparatus of claim 1, further comprising a valve positioned in fluid communication with the air scoop, the valve being changeable from a first configuration to a second configuration with the valve blocking at least a portion of air captured by the air scoop from passing into the pressurized portion of the aircraft when the valve is in the first configuration, the valve allowing at least a portion of the air captured by the air scoop into the pressurized portion of the aircraft when the valve is in the second configuration.

9. The apparatus of claim 1, further comprising a valve positioned in fluid communication with the air scoop, the valve being changeable from a first configuration to a second configuration with the valve blocking all the air captured by the air scoop from passing into the pressurized portion of the aircraft when the valve is in the first configuration, the valve allowing approximately all the air captured by the air scoop into the pressurized portion of the aircraft when the valve is in the second configuration.

10. The apparatus of claim 1, further comprising:

a valve positioned in fluid communication with the air scoop, the valve being changeable from a first configuration to a second configuration, with the valve blocking at least a portion of air captured by the air scoop from passing into the pressurized portion of the aircraft when the valve is in the first configuration, the valve allowing at least a portion of the air captured by the air scoop into the pressurized portion when the valve is in the second configuration; and a latch member positioned proximate to the valve, the latch member being moveable from a first latch position to a second latch position, with the latch member at least restricting the valve from changing from the first configuration to the second configuration when the latch member is in the first latch position, and with the latch member allowing the valve to change from the first configuration to the second configuration when the latch member is in the second latch position.

11. The apparatus of claim 1, further comprising a valve assembly in fluid communication with the air scoop, the valve assembly being changeable between a first configuration and a second configuration, the valve assembly at least restricting air from passing from the air scoop into the pressurized portion of the aircraft when the valve assembly is in the first configuration, the valve assembly allowing air to pass from the air scoop into the pressurized portion of the aircraft when the valve assembly is in the second configuration, the valve assembly being operatively coupled to a pressure sensor to change from the first configuration to the second configuration when a pressure external to the pressurized portion is at least equal to a pressure internal to the pressurized portion.

12. The apparatus of claim 1 wherein the air scoop is configured to be mounted to the fuselage of the aircraft.

13. The apparatus of claim 1 wherein the air scoop is configured to be mounted to a wing of the aircraft.

14. The apparatus of claim 1, further comprising the aircraft, and wherein the aircraft includes a fuselage, further wherein the air scoop is mounted to the fuselage of the aircraft.

15. The apparatus of clam 1 wherein the air scoop is moveable to a third position between the first and second positions.

16. An apparatus for controlling aircraft airflow, comprising:

an air scoop having an inlet and an outlet, the inlet defining a capture area, the air scoop being configured to mount to the aircraft and be movable relative to at least a portion of the aircraft between a first position and a second position to change an exposed capture area of the inlet, the inlet being oriented with no portion or a first portion of the capture area exposed when the air scoop is in the first position, the inlet being oriented with a second portion of the capture area exposed when the air scoop is in the second position, the second portion of the capture area being greater than zero and/or greater than the first portion, wherein the outlet of the air scoop is configured to be coupled in fluid communication with a pressurized portion of the aircraft to convey captured air received from the inlet to the pressurized portion, and wherein the air scoop is configured to significantly increase the drag of the aircraft when the air scoop is in the second position;

a valve coupled in fluid communication with the air scoop, the valve being changeable from a first configuration to a second configuration, the valve being positioned to pass none of the captured air or a first quantity of the captured air toward the pressurized portion when in the first configuration, the valve being positioned to pass a second quantity of the captured air toward the pressurized portion when in the second configuration, the second quantity of the captured air being greater than the first quantity;

a latch member operatively coupled to the valve and moveable between a first latch position and a second latch position, with the latch member at least restricting a change in configuration of the valve when the latch member is in the first latch position, and with the latch member allowing a change in configuration of the valve when the latch member is in the second latch position; and a pressure sensor operatively coupled to the latch member to move the latch member from the first position to the second position when a pressure within the pressurized portion falls below a selected value.

17. The apparatus of claim 16 wherein the air scoop is positioned to direct the captured air toward the pressurized portion of the aircraft with at least a portion of the captured air bypassing all primary engines and auxiliary power units of the aircraft.

18. The apparatus of claim 16 wherein the valve includes a pivotable valve.

19. An apparatus for controlling drag and onboard airflow for an aircraft, comprising:

an air scoop having an inlet and an outlet, the air scoop being configured to mount to the aircraft and be moveable relative to at least a portion of the aircraft between a first position and a second position, with the inlet being oriented to intercept a quantity of air external to the aircraft when in the second position; wherein the outlet is coupleable to a pressurized cargo portion of the aircraft configured to carry a removable cargo payload to convey to the pressurized cargo portion captured air received from the inlet before the captured air is provided to a pressurized cabin portion of the aircraft.

20. The apparatus of claim 19, further comprising a valve in fluid communication with the air scoop, the valve being moveable from a first valve position to a second valve position, the valve being positioned to block at least part of the captured air from entering the pressurized cargo portion when the valve is in the first valve position, the valve being positioned to pass at least part of the captured airflow into the pressurized cargo portion when the airflow valve is in the second valve position.

21. The apparatus of claim 19 wherein the air scoop is positioned to direct the captured air toward the pressurized cargo portion with at least a portion of the captured air bypassing all primary engines and auxiliary power units of the aircraft.

22. The apparatus of claim 19, further comprising:

a valve positioned in fluid communication with the air scoop, the valve being changeable from a first configuration to a second configuration, with the valve blocking at least a portion of air captured by the air scoop from passing into the pressurized portion of the aircraft when the valve is in the first configuration, the valve allowing at least a portion of the air captured by the air scoop into the pressurized portion when the valve is in the second configuration;

a latch member operatively coupled to the valve and moveable between a first latch position and a second latch position, with the latch member at least restricting motion of the valve when the latch member is in the first latch position, and with the latch member allowing motion of the valve when the latch member is in the second latch position; and a pressure sensor operatively coupled to the latch member to move the latch member from the first latch position to the second latch position when a pressure within the pressurized portion falls below a selected pressure.

23. The apparatus of claim 19 wherein the air scoop includes a flow passage between the inlet and the outlet.

24. The apparatus of claim 19 wherein the air scoop includes a generally straight flow passage between the inlet and the outlet.

25. The apparatus of claim 19 wherein the air scoop is configured to significantly increase a drag of the aircraft from a first value when the air scoop is in the first position to a second value when the air scoop is in the second position.

26. An apparatus for controlling aircraft airflow, comprising:

an air scoop having an inlet and an outlet, the air scoop being configured to mount to the aircraft and be moveable relative to at least a portion of the aircraft between a first position and a second position, with the air scoop oriented to capture air when in the second position; wherein the outlet is configured to be coupled in fluid communication with a pressurized portion of the aircraft when the air scoop is in the second position to convey air from the inlet to the pressurized portion; and wherein the air scoop is configured to significantly increase the drag of the aircraft from a first value when the air scoop is in the first position to a second value when the air scoop is in the second position, the apparatus further comprising;

an airflow valve coupled in fluid communication with the air scoop, the airflow valve being moveable from a first valve position to a second valve position, the airflow valve being positioned to pass none of the captured air or a first quantity of the captured air toward the pressurized portion when in the first valve position, the airflow valve being positioned to pass a second quantity of the captured air toward the pressurized portion when in the second valve position, the second quantity of the captured air being greater than the first quantity;

a latch member operatively coupled to the airflow valve and moveable between a first latch position and a second latch position, with the latch member at least restricting motion of the airflow valve when the latch member is in the first latch position, and with the latch member allowing motion of the airflow valve when the latch member is in the second latch position; and a pressure sensor operatively coupled to the latch member to move the latch member from the first latch position to the second latch position when a pressure within the pressurized portion falls below a selected value.

27. An apparatus for controlling aircraft airflow, comprising:

an air scoop having an inlet and an outlet, the air scoop being configured to mount to the aircraft and be moveable relative to at least a portion of the aircraft between a first position and a second position, the inlet being oriented to receive no air or a first quantity of air when the air scoop is in the first position, the inlet being oriented to receive a second quantity of air greater than zero and/or greater than the first quantity when the air scoop is in the second position; wherein the outlet is configured to be coupled in fluid communication with a pressurized portion of the aircraft when the air scoop is in the second position to convey air from the inlet to the pressurized portion with at least a portion of the air bypassing all primary engines and auxiliary power units of the aircraft before entering the pressurized portion;

a valve positioned in fluid communication with the air scoop, the valve being changeable from a first configuration to a second configuration, with the valve blocking at least a portion of air captured by the air scoop from passing into the pressurized portion of the aircraft when the valve is in the first configuration, the valve allowing at least a portion of the air captured by the air scoop into the pressurized portion when the valve is in the second configuration;

a latch member operatively coupled to the valve and moveable between a first latch position and a second latch position, with the latch member at least restricting motion of the valve when the latch member is in the first latch position, and with the latch member allowing motion of the valve when the latch member is in the second latch position; and a pressure sensor operatively coupled to the latch member to move the latch member from the first latch position to the second latch position when a pressure within the pressurized portion falls below a selected level.

28. The apparatus of claim 27 wherein the air scoop is configured to significantly increase a drag of the aircraft from a first value when the air scoop is in the first position to a second value when the air scoop is in the second position.

29. The apparatus of claim 27 wherein the inlet of the air scoop has an edge defining a capture area, and wherein no portion or a first portion of the capture area is exposed when the air scoop is in the first position, and wherein a second portion of the capture area is exposed when the air scoop is in the second position, the second portion of the capture area being greater than zero and/or greater than the first portion.

30. An aircraft, comprising:

an enclosed pressurized payload portion;

an air scoop having an inlet and an outlet, the air scoop being mounted to the aircraft and movable relative to at least a portion of the aircraft between a first position and a second position, the outlet being coupled in fluid communication with the pressurized payload portion when the air scoop is in the second position to convey air from the inlet to the pressurized payload portion; wherein the air scoop is configured to significantly increase the drag of the aircraft from a first value when the air scoop is in the first position to a second value when the air scoop is in the second position, the increase in drag being sufficient to increase a rate of descent of the aircraft from a third value when the air scoop is in the first position to a fourth value when the air scoop is in the second position.

31. The aircraft of claim 30 wherein the inlet has a capture area and wherein the inlet is oriented with no portion or a first portion of the capture area exposed when the air scoop is in the first position, the inlet being oriented with a second portion of the capture area exposed when the air scoop is in the second position, the second portion of the capture area being greater than zero and/or greater than the first portion.

32. The aircraft of claim 30 wherein the air scoop is positioned to convey air from the inlet to the pressurized payload portion with at least a portion of the air bypassing all primary engines and auxiliary power units of the aircraft.

33. The aircraft of claim 30 wherein the pressurized payload portion is housed in a fuselage configured to cruise at a Mach number of from about 0.95 to about 0.99.

34. The aircraft of claim 30 wherein the pressurized payload portion includes a cabin portion and a cargo portion, and wherein the outlet is in direct fluid communication with the cargo portion.

35. The aircraft of claim 30 wherein the pressurized payload portion is positioned in a fuselage of the aircraft, the fuselage having a first side and a second side, and wherein the air scoop is a first air scoop positioned on the first side of the fuselage, and wherein the aircraft further comprises a second air scoop positioned on the second side of the fuselage, the second air scoop having an inlet and an outlet, the inlet defining a capture area, the second air scoop being mounted to the aircraft and movable relative to at least a portion of the aircraft between a first position and a second position to change an exposed capture area of the inlet, the outlet of the second air scoop being coupled in fluid communication with the pressurized payload portion when the second air scoop is in the second position to convey air from the inlet of the second air scoop to the pressurized payload portion.

36. The aircraft of claim 30 wherein the aircraft includes a fuselage and wherein the air scoop is pivotably coupled to the fuselage.

37. The aircraft of claim 30 wherein the aircraft includes a wing portion and wherein the air scoop depends from the wing portion.

38. The aircraft of claim 30 wherein the air scoop is positioned to translate between the first and second positions.

39. The aircraft of claim 30 wherein the air scoop is a first air scoop, and wherein the aircraft further comprises a second air scoop positioned aft of the first air scoop, the second air scoop being in fluid communication with the pressurized payload portion of the aircraft.

40. The aircraft of claim 30 wherein the air scoop is a first air scoop, and wherein the aircraft further comprises a second air scoop spaced apart transversely from the first air scoop.

41. The aircraft of claim 30 wherein the pressurized portion is positioned in a fuselage of the aircraft.

42. The aircraft of claim 30 wherein the air scoop is configured to automatically move from the first position to the second position when a pressure within the pressurized portion falls below a selected level.

43. The aircraft of claim 30 wherein the air scoop is configured to move from the first position to the second position based on an operator command.

44. The aircraft of claim 30 wherein the air scoop is at least approximately flush with an external surface of the aircraft when the air scoop is in the first position, and wherein at least a portion of the inlet projects away from the external surface when the air scoop is in the second position.

45. A method for controlling aircraft drag and onboard airflow, comprising:

moving an air scoop from a first position to a second position, the air scoop having a capture area with no portion or a first portion of the capture area exposed when the air scoop is in the first position, and with a second portion of the capture area exposed when the air scoop is in the second position, the second portion of the capture area being greater than zero and/or greater than the first portion;

increasing a drag and descent rate of the aircraft by positioning a valve in a first valve position to prevent at least a portion of air intercepted by the air scoop from entering a pressurized portion of the aircraft; and increasing a pressure in the pressurized portion of the aircraft by positioning the valve in a second valve position to allow at least a portion of the air intercepted by the air scoop to pass into the pressurized portion.

46. The method of claim 45, further comprising:

at least restricting the valve from moving from the first valve position to the second valve position while a pressure of air in the air scoop is less than a pressure in the pressurized portion; and allowing the valve to move from the first valve position to the second valve position when the pressure of air in the air scoop exceeds the pressure in the pressurized portion.

47. The method of claim 46 wherein at least restricting a valve includes engaging a pressure-actuated latch member with the valve when a pressure in the air scoop is less than a selected pressure and disengaging the latch member when the pressure in the air scoop exceeds the selected value.

48. The method of claim 45 wherein increasing a pressure in the pressurized portion of the fuselage includes directing air from the air scoop into a cargo portion of the fuselage and directing air from the cargo portion to a cabin portion of the fuselage.

49. A method for controlling aircraft drag and onboard airflow, comprising:
   moving an air scoop of the aircraft from a first position generally flush with a fuselage of the aircraft to a second position with the air scoop intercepting oncoming air external to the aircraft;
   increasing a drag of the aircraft by positioning a valve to prevent at least a portion of the air intercepted by the air scoop from entering a pressurized cargo portion of the fuselage; and
   increasing a pressure in a pressurized cabin portion of the fuselage by positioning the valve to allow at least a portion of the air intercepted by the air scoop to pass into a cargo portion of the aircraft before passing the air into the cabin portion of the aircraft and then passing the air from the cargo portion to the cabin portion, the cargo portion being configured to carry a removable cargo payload.

50. The method of claim 49 wherein passing air from the cargo portion to the cabin portion includes passing air through a floor of the cabin portion.

51. A method for controlling aircraft onboard airflow comprising:
   moving an air scoop of the aircraft from a first position to a second position, the air scoop having a capture area with no portion or a first portion of the capture area exposed when the air scoop is in the first position, and with a second portion of the capture area exposed when the air scoop is in the second position, the second portion of the capture area being greater than zero and/or greater than the first portion;
   increasing a pressure in a pressurized portion of the aircraft by directing at least a portion of air intercepted by the air scoop into the pressurized portion when the air scoop is in the second position, at least a portion of the air directed into the pressurized portion bypassing all primary engines and auxiliary power units of the aircraft before entering the pressurized portion;
   significantly increasing a drag and descent rate of the aircraft by restricting at least a portion of the air captured by the air scoop from entering the pressurized portion of the aircraft while a pressure of the air is less than a pressure of the pressurized portion; and
   directing at least a portion of the air captured by the air scoop into the pressurized portion of the aircraft when a pressure of the air exceeds the pressure of the pressurized portion.

52. The method of claim 51 wherein moving an air scoop includes pivoting the air scoop from the first position to the second position.

53. The method of claim 51 wherein conveying at least a portion of the air includes directing at least a portion of the air into a cargo portion of the aircraft and from the cargo portion into a cabin portion of the aircraft.

54. The method of claim 51 further comprising:
   undergoing an at least partial depressurization of the aircraft while flying the aircraft at an altitude of at least 40,000 feet;
   moving the air scoop to the second position after the at least partial depressurization; and
   descending to an altitude of less than 25,000 feet before exposing the pressurized portion to a pressure altitude of greater than 25,000 feet for more than 120 seconds.

55. An aircraft, comprising:
   an enclosed pressurized portion including a cargo portion configured to carry a removable cargo payload, and a cabin portion; and
   an air scoop having an inlet and an outlet, the air scoop being mounted to the aircraft and movable between a first position and a second position, the inlet being oriented to intercept a quantity of air external to the aircraft when the air scoop is in the second position, the outlet being in fluid communication with the cargo portion of the fuselage to convey air from the inlet to the cargo portion before the air passes to the cabin portion.

56. The aircraft of claim 55, further comprising a valve positioned to control the flow of air through the air scoop.

57. The aircraft of claim 56 wherein the valve is movable between a first valve position and a second valve position with the valve blocking at least a portion of the air captured by the air scoop from entering the pressurized portion when the valve is in the first valve position, and with the valve allowing at least a portion of the air captured by the air scoop to enter the pressurized portion when the valve is in the second valve position.

58. The aircraft of claim 56 wherein the valve is movable between a first valve position and a second valve position with the valve blocking at least a portion of the air captured by the air scoop from entering the pressurized portion when the valve is in the first valve position, and with the valve allowing at least a portion of the air captured by the air scoop to enter the pressurized portion when the valve is in the second valve position, and wherein the valve is configured to move between the first and second valve positions upon a command from an operator.

59. The aircraft of claim 56 wherein the valve is movable between a first valve position and a second valve position with the valve blocking at least a portion of the air captured by the air scoop from entering the pressurized portion when the valve is in the first valve position, and with the valve allowing at least a portion of the air captured by the air scoop to enter the pressurized portion when the valve is in the second valve position, and wherein the valve is configured to move between the first and second valve positions automatically when a pressure in the air scoop exceeds a pressure in the pressurized portion.

60. The aircraft of claim 56, further comprising:
   a latch member operatively coupled to the valve and moveable between a first position and a second position, with the latch member at least restricting motion of the valve when the latch member is in the first position, and with the latch member allowing motion of the valve when the latch member is in the second position; and
   a pressure sensor operatively coupled to the latch member to move the latch member from the first position to the second position when a pressure within the pressurized portion falls below a selected value.

61. The aircraft of claim 55, wherein the pressurized portion includes a fuselage and wherein the inlet is at least approximately flush with an external surface of the fuselage when the air scoop is in the first position.

62. The aircraft of claim 55 wherein the air scoop is positioned to bypass at least a portion of the air around all primary engines and auxiliary power units of the aircraft before the portion of the air enters the pressurized portion of the aircraft.

63. The aircraft of claim 55 wherein the air scoop is a first air scoop, and wherein the aircraft further comprises a second air scoop in fluid communication with the cargo portion of the aircraft.

64. An apparatus for controlling aircraft airflow, comprising:

an air scoop having an inlet and an outlet, the air scoop being configured to mount to the aircraft and be movable relative to at least a portion of the aircraft between a first position and a second position, with the air scoop oriented to capture air when in the second position; wherein the outlet is configured to be coupled in fluid communication with a pressurized portion of the aircraft when the air scoop is in the second position to convey air from the inlet to the pressurized portion; and wherein the air scoop is configured to significantly increase the drag of the aircraft from a first value when the air scoop is in the first position to a second value when the air scoop is in the second position, the apparatus further comprising;

a valve positioned in fluid communication with the air scoop, the valve being changeable from a first configuration to a second configuration, with the valve blocking at least a portion of air captured by the air scoop from passing into the pressurized portion of the aircraft when the valve is in the first configuration, the valve allowing at least a portion of the air captured by the air scoop into the pressurized portion when the valve is in the second configuration; and a latch member positioned proximate to the valve, the latch member being moveable from a first latch position to a second latch position, with the latch member at least restricting the valve from changing from the first configuration to the second configuration when the latch member is in the first latch position, and with the latch member allowing the valve to change from the first configuration to the second configuration when the latch member is in the second latch position.

65. An apparatus for controlling aircraft airflow, comprising:

an air scoop having an inlet and an outlet, the air scoop being configured to mount to the aircraft and be movable relative to at least a portion of the aircraft between a first position and a second position, with the air scoop oriented to capture air when in the second position; wherein the outlet is configured to be coupled in fluid communication with a pressurized portion of the aircraft when the air scoop is in the second position to convey air from the inlet to the pressurized portion; and wherein the air scoop is configured to significantly increase the drag of the aircraft from a first value when the air scoop is in the first position to a second value when the air scoop is in the second position, the apparatus further comprising;

a valve assembly in fluid communication with the air scoop, the valve assembly being changeable between a first configuration and a second configuration, the valve assembly at least restricting air from passing from the air scoop into the pressurized portion of the aircraft when the valve assembly is in the first configuration, the valve assembly allowing air to pass from the air scoop into the pressurized portion of the aircraft when the valve assembly is in the second configuration, the valve assembly being operatively coupled to a pressure sensor to change from the first configuration to the second configuration when a pressure external to the pressurized portion is at least equal to a pressure internal to the pressurized portion.

66. An apparatus for controlling aircraft airflow, comprising:

an air scoop, the air scoop having an inlet and an outlet, the air scoop being configured to mount directly to a wing of the aircraft and be movable relative to at least a portion of the aircraft between a first position and a second position, with the air scoop oriented to capture air when in the second position; wherein the outlet is configured to be coupled in fluid communication with a pressurized portion of the aircraft when the air scoop is in the second position to convey air from the inlet to the pressurized portion; and wherein the air scoop is configured to significantly increase the drag of the aircraft from a first value when the air scoop is in the first position to a second value when the air scoop is in the second position.

67. A method for controlling aircraft drag and onboard airflow, comprising:

moving an air scoop from a first position to a second position, the air scoop having a capture area with no portion or a first portion of the capture area exposed when the air scoop is in the first position, and with a second portion of the capture area exposed when the air scoop is in the second position, the second portion of the capture area being greater than zero and/or greater than the first portion;

increasing a drag of the aircraft by positioning a valve in a first valve position to prevent at least a portion of air intercepted by the air scoop from entering a pressurized portion of the aircraft;

increasing a pressure in the pressurized portion of the aircraft by positioning the valve in a second valve position to allow at least a portion of the air intercepted by the air scoop to pass into the pressurized portion;

at least restricting the valve from moving from the first valve position to the second valve position while a pressure of air in the air scoop is less than a pressure in the pressurized portion, wherein at least restricting a valve includes engaging a pressure-actuated latch member with the valve when a pressure in the air scoop is less than a selected pressure and disengaging the latch member when the pressure in the air scoop exceeds the selected value; and allowing the valve to move from the first valve position to the second valve position when the pressure of air in the air scoop exceeds the pressure in the pressurized portion.

68. An aircraft, comprising:

a fuselage having a pressurized payload portion including a cargo portion and a cabin portion;

an air scoop having an inlet and an outlet, the inlet defining a capture area, the air scoop being mounted to the fuselage and movable between a first position and a second position to change an exposed capture area of the inlet, the inlet being at least approximately flush with an external surface of the fuselage when the air scoop is in the first position, the inlet being oriented to intercept a quantity of air external to the aircraft when the air scoop is in the second position, the outlet being in fluid communication with the cargo portion of the fuselage to convey air from the inlet to the cargo portion before the air passes to the cabin portion, with at least a portion of the air bypassing all primary engines and auxiliary power units of the aircraft before passing into the cargo portion;

a valve positioned to control the flow of air through the air scoop, the valve being movable between a first valve position and a second valve position with the valve blocking at least a portion of the air from entering the cargo portion when the valve is in the first valve position, the valve passing at least a portion of the air toward the cargo portion when the valve is in the second valve position; and a pressure-actuated latch member operatively coupled to the valve and movable between an engaged position and a disengaged position, wherein the latch member obstructs motion of the valve from the first valve position to the second valve position when the latch member is in the engaged position and allows motion of the valve from the first valve position to the second valve position when the latch member is in the disengaged position, the latch member being in the engaged position when a pressure within the pressurized payload portion exceeds a selected value, the latch member being in the disengaged position when a pressure within the pressurized payload portion falls below the selected value.

69. The aircraft of claim 68 wherein the fuselage has a first side and a second side, and wherein the air scoop is a first air scoop positioned on the first side of the fuselage, and wherein the aircraft further comprises a second air scoop positioned on the second side of the fuselage, the second air scoop having an inlet and an outlet, the second air scoop being mounted to the aircraft and movable relative to at least a portion of the aircraft between a first position and a second position, the outlet of the second air scoop being coupled in fluid communication with the pressurized payload portion when the air scoop is in the second position to convey air from the inlet to the pressurized payload portion.

70. An aircraft, comprising:

an enclosed pressurized payload portion; and scoop means coupled to the aircraft and movable relative to the aircraft between a first position and a second position, the scoop means being oriented to capture air external to the aircraft when the scoop means are in the second position, wherein the scoop means are in fluid communication with the pressurized payload portion to selectively convey air to the pressurized payload portion when in the second position, further wherein the scoop means significantly increase a drag and descent rate of the aircraft when the scoop means are moved from the first position to the second position.

71. The aircraft of claim 70 wherein the scoop means have a capture area and are oriented with no portion or a first portion of the capture area exposed when the scoop means are in the first position, the scoop means being oriented with a second portion of the capture area exposed when the scoop means are in the second position, the second portion of the capture area being greater than zero and/or greater than the first portion.

72. The aircraft of claim 70 wherein the scoop means include a forward facing inlet.

73. The aircraft of claim 70 wherein the scoop means are at least approximately flush with an external surface of the aircraft when the scoop means are in the first position, at least a portion of the scoop means projecting outwardly from the outer surface when the scoop means are in the second position.

74. The aircraft of claim 70 wherein the scoop means are pivotably coupled to a fuselage of the aircraft.

75. The aircraft of claim 70, further comprising valve means operatively coupled to the scoop means to control a flow of air from the scoop means to the pressurized payload portion of the aircraft.

76. A method for controlling aircraft airflow, comprising:

significantly increasing a drag and descent rate of the aircraft by moving an air scoop from a first position to a second position; and conveying at least a portion of the air intercepted by the air scoop to a pressurized payload portion of the aircraft.

77. The method of claim 76 wherein moving the air scoop from the first position to the second position includes increasing an exposed capture area of the air scoop.

78. The method of claim 76 wherein the air scoop has a capture area with no portion or a first portion of the capture area exposed when the air scoop is in the first position, and with a second portion of the capture area exposed when the air scoop is in the second position, the second portion of the capture area being greater than zero and/or greater than the first portion.

79. The method of claim 76 wherein conveying at least a portion of the air includes directing at least a portion of the air into the pressurized portion before directing the portion of the air through any primary engines or auxiliary power units of the aircraft.

80. The method of claim 76, further comprising:

restricting at least a portion of the air captured by the air scoop from entering the pressurized portion of the aircraft while a pressure of the air is less than a pressure of the pressurized portion; and directing at least a portion of the air captured by the air scoop into the pressurized portion of the aircraft when a pressure of the air exceeds the pressure of the pressurized portion.

81. The method of claim 76 wherein moving an air scoop includes pivoting the air scoop from the first position to the second position.

82. The method of claim 76 wherein conveying at least a portion of the air includes directing at least a portion of the air into a cargo portion of the aircraft and from the cargo portion into a cabin portion of the aircraft.

83. The method of claim 76 wherein moving the air scoop is completed automatically in response to a depressurization of a portion of the aircraft.

84. The method of claim 76, further comprising:

undergoing an at least partial depressurization of the aircraft while flying the aircraft at an altitude of at least 40,000 feet;

moving the air scoop to the second position after the at least partial depressurization; and descending to an altitude of less than 25,000 feet before exposing the pressurized portion to a pressure-altitude of greater than 25,000 feet for more than 120 seconds.

85. The method of claim 76, further comprising:

undergoing an at least partial depressurization of the aircraft while flying the aircraft at an altitude of at least 50,000 feet;

moving the air scoop to the second position after the at least partial depressurization; and descending to an altitude of less than 25,000 feet before exposing the pressurized portion to a pressure-altitude of greater than 25,000 feet for more than 120 seconds.

86. The method of claim 76 wherein significantly increasing the drag of the aircraft includes increasing a drag per frontal area of the aircraft from a first value to a second value that is from about 1.25 to about 2.0 times the first value.

* * * * *